United States Patent
Berger et al.

(10) Patent No.: US 9,804,936 B1
(45) Date of Patent: *Oct. 31, 2017

(54) RELATIONAL DATABASE RECOVERY

(71) Applicant: INTERNATIONAL BUSINESS MACHINES CORPORATION, Armonk, NY (US)

(72) Inventors: Jeffrey Berger, San Jose, CA (US); William J Franklin, San Ramon, CA (US); Laura M. Kunioka-Weis, Morgan Hill, CA (US); Thomas Majithia, San Jose, CA (US); Haakon P. Roberts, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/362,857

(22) Filed: Nov. 29, 2016

Related U.S. Application Data

(63) Continuation of application No. 15/184,038, filed on Jun. 16, 2016, now Pat. No. 9,558,077.

(51) Int. Cl.
  *G06F 17/30* (2006.01)
  *G06F 11/14* (2006.01)

(52) U.S. Cl.
  CPC ...... *G06F 11/1469* (2013.01); *G06F 11/1448* (2013.01); *G06F 11/1471* (2013.01); *G06F 17/30368* (2013.01); *G06F 17/30595* (2013.01)

(58) Field of Classification Search
  CPC ......... G06F 17/30312; G06F 17/30353; G06F 17/30368
  See application file for complete search history.

(56) References Cited

U.S. PATENT DOCUMENTS 5,873,091 A    2/1999  Garth et al.
6,289,355 B1   9/2001  Haderle et al.
(Continued)

FOREIGN PATENT DOCUMENTS

CN    101853287    10/2010

OTHER PUBLICATIONS

IBM et al., "Page Recovery Using Multiple Logs in a Data Sharing Environment," http://ip.com/000101668 (2005).
(Continued)

*Primary Examiner* — Grace Park
(74) *Attorney, Agent, or Firm* — Weitzman Law Offices, LLC

(57) ABSTRACT

A database recovery and index rebuilding system involves at least one processor coupled to memory, storage, a database, and sets of image copies and post-backup updates. When database reconstruction is required, the processor will i) access the image copies; ii) access post-backup updates to be re-applied; iii) without regard to "ii)", read data pages to be recovered into objects; iv) concurrently with "iii)", retrieve and sort log records from the post-backup updates; v) as the data pages to be recovered are read in "iii)", apply the sorted log records; vi) as "e)" completes and concurrently with "v)", extract and sort index keys; vii) concurrently with "vi)" and on an individual recovered page basis, write the recovered data pages into the database; viii) when all index keys have been extracted and sorted, initiate database index rebuilds; and ix) when rebuilt, store the rebuilt indexes without regard to whether "vii)" has completed.

1 Claim, 2 Drawing Sheets

FIG. 2

(56) References Cited

U.S. PATENT DOCUMENTS

| | | | |
|---|---|---|---|
| 6,594,676 B1 | 7/2003 | Moore | |
| 7,028,022 B1 | 4/2006 | Lightstone et al. | |
| 8,694,472 B2 | 4/2014 | Marshall | |
| 2008/0281865 A1* | 11/2008 | Price | G06F 17/30362 |
| 2011/0035359 A1* | 2/2011 | Bendakovsky | G06F 11/1458 707/640 |
| 2012/0179655 A1* | 7/2012 | Beatty | G06F 11/1451 707/646 |

OTHER PUBLICATIONS

IBM et al., Recovery of Data Pages after Partial Page Writes,: http://ip.com/IPCOM/00012402 (2005).
Anonymous, "Data Recovery Depending on the Index Segment," http://ip.com/IPCOM000241553 (2015).
Sauer et al., "Single-pass Restore after a Media Failure," Conference BTW 2015 at Hamburg, Germany (2015).

* cited by examiner

RELATIONAL DATABASE RECOVERY

CROSS REFERENCE TO RELATED APPLICATIONS

This application is a continuation of U.S. patent application Ser. No. 15/184,038, the entirety of which is incorporated herein by reference.

FIELD OF THE INVENTION

This disclosure relates generally to computers and, more particularly, to recovery of relational databases.

BACKGROUND

In relational database management systems (DBMSs), when a database must be recovered due to some problem or issue, the elapsed time for data recovery followed by the rebuild of indexes can be very long for large amounts of data, in some cases, many hours. During this recovery time period, the data from that database is completely unavailable and processing capability is reduced or eliminated for the processor(s) involved in the recovery process. Service Level Agreements (SLA) applicable in the banking, financial, retail, insurance and IT services industries, which define the maximum amount of time for data recovery, are extremely aggressive due to the nature of those businesses. Prolonged outages can lead to financial penalties and loss of business both for the database owner and the party responsible for SLA compliance (if different from the database owner).

Current database rebuilding processes are highly sequential and uses a buffer pool (also called a buffer cache), which is a portion of a main memory space allocated by the database manager to cache table and index data from the disk containing the database in order to reduce the amount of database input/output (I/O) and database data and index access time.

Thus, there is an ongoing technological need for an improvement to the way databases operate with respect to rebuilding the database when required.

SUMMARY

One aspect of the present invention described and claimed herein involves a database recovery and index rebuilding system. The system is made up of at least one processor coupled to memory, so that that the processor can read from and write to the memory, and non-transitory storage, having stored therewithin: i) program instructions that can be accessed and executed by the processor to effect database recovery and index rebuilding, and ii) a relational database system, wherein the relational database system includes: a) a database, b) a set of image copies, and c) a set of post-backup updates, wherein the post-backup updates comprise log records each having an associated an identifier of an object to which each log record applies, an identifier of a data page to which each log record applies, and a timestamp indicating when each log record was made. When reconstruction of the database is required, the program instructions will be executed by the processor and will cause the processor to: i) access the image copies as recovery bases; ii) access a range of post-backup updates, within the set of post-backup updates, that must be re-applied to data from the image copy recovery bases in order to reconstruct the database; iii) without regard to step "ii)", read data pages to be recovered from the image copy recovery bases into objects in the memory; iv) concurrently with step "iii)", retrieve, into the memory, all log records from the post-backup updates applicable to the data pages to be recovered and sort the retrieved log records by object, data page number and timestamp; v) as the data pages to be recovered are read into the objects in step "iii)", apply the sorted log records to their respective data pages, in timestamp order, until all of the sorted log records have been applied to all of their respective data pages; vi) as the applying of the respective sorted log records to the data pages in step "e)" completes for individual data pages and concurrently with the performing of step "v)" with respect to specific data pages for which the applying is not yet complete, extract and sort index keys, from the individual data pages for which the applying is complete, until all the index keys have been extracted from all the individual data pages and sorted; vii) concurrently with step "vi)" and on an individual recovered page basis, write the recovered individual data pages, for which the extraction of the index keys is complete, into the database in the non-transitory storage; viii) when all index keys have been extracted and sorted from all of the recovered individual data pages, initiate a rebuild of database indexes using the sorted index keys; and ix) when the database indexes have been rebuilt using the sorted index keys, write the rebuilt indexes to the storage without regard to whether step "vii)" has completed.

Our invention is a significant improvement to the functioning of a computer specifically tasked with rebuilding a database, and only has utility with respect to rebuilding of databases. More particularly, our invention provides a specific solution to a significant problem with the processes by which database rebuilding software operates in that it improves the way the computer stores and retrieves data necessary for rebuilding a computer database to provide a significant improvement in the time necessary to rebuild a large database relative to current approaches.

Indeed, our invention represents a unique and specific improvement to the process used to rebuild such databases, more particularly, an improvement to the logical structure and processes by which databases are be rebuilt after some problem or issue has occurred.

Various technical advantages and benefits flow from our invention, for example, it significantly improves the efficiency of a computer's ability to perform database recovery relative to current database recovery processes, thereby freeing up that computer's processing capability for other tasks, it reduces the number of read I/Os and random write I/Os typically involved with database rebuild, and consequently, it reduces the time needed to rebuild a large database so that the rebuilt database will be operational and available much faster than it would using conventional data recovery processes, thereby improving SLA compliance.

The foregoing and following outlines rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

This disclosure provides a technical solution to address the aforementioned problems inherent with relational database recovery.

Figure 1:
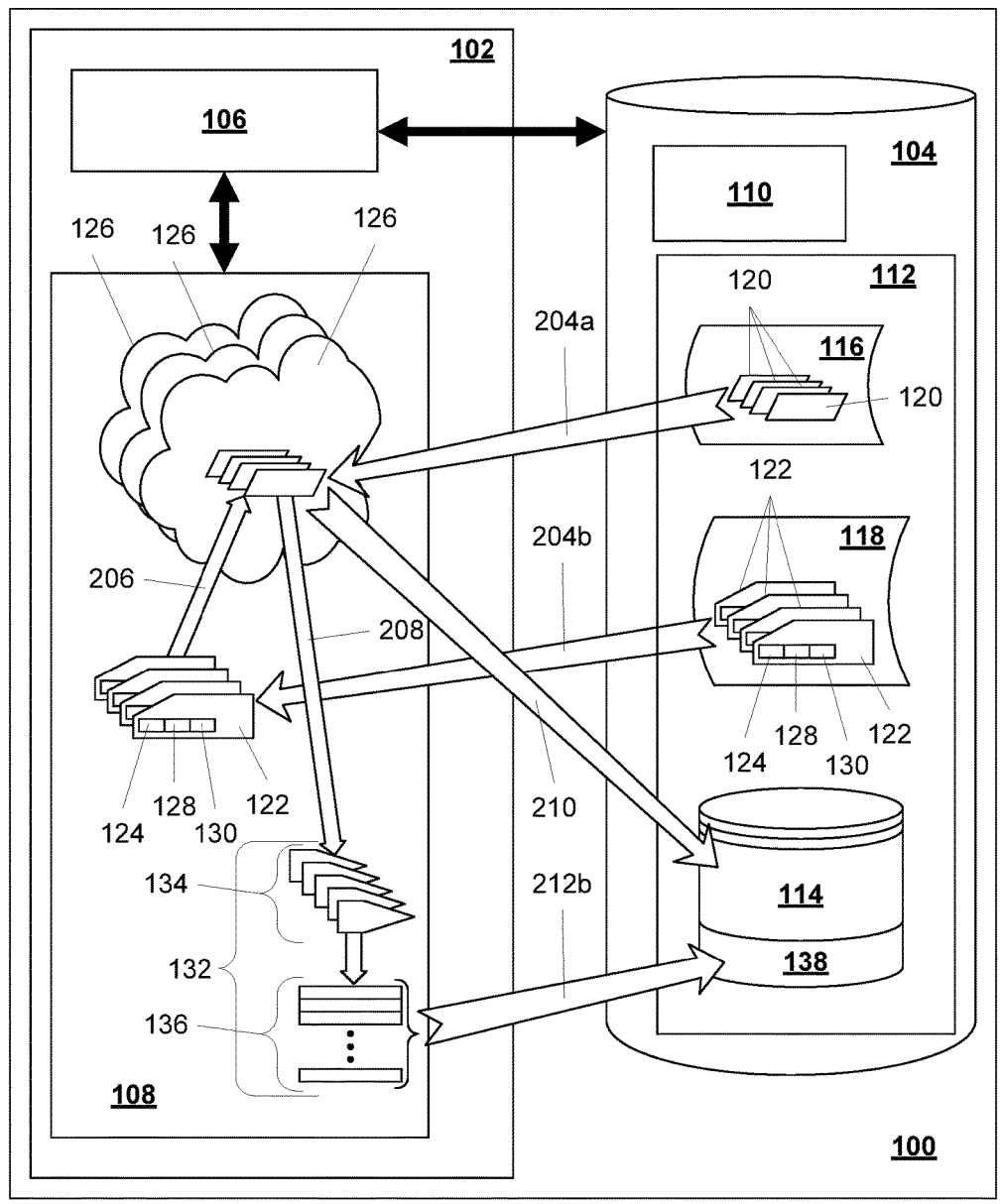
FIG. 1 illustrates, in simplified form, an overview of a computer system made up of at least a computer and associated non-transitory storage incorporating our relational database recovery invention.

FIG. 1 illustrates, in simplified form, an overview of a computer system 100 made up of at least a computer 102 and associated storage 104 incorporating our relational database recovery invention.

As shown, the computer 100 may be as simple as a uni-processor computer, a more complex computer, for example, a single server, or, for example, a highly complex distributed computer. In general, the computer 102 is made up of at least one, and typically more, processor(s) 106 and memory 108 that the processor(s) 106 can read from and write to.

The storage 104 can be written to and read from, and stores data, data-containing structures, and program instructions in a non-transitory manner, for example, such as non-transient solid state memory, a magnetic hard drive, a CD or DVD, a tape drive, or an analogous or equivalent storage medium type would.

The storage 104, which may be physically a single device or multiple storage devices, has stored within it at least program instructions 110 that can be accessed and executed by the processor(s) 106 to, at least, effect the database recovery operations as described herein, and a relational database system 112. The database system 112 is made up of the database 114 itself, which can be localized or distributed, a set of image copies 116, which are backups of data pages 120 that can be used as a basis for recovery in the event of an issue or problem with the database 114, for example, data corruption or a crash, and a set of post-backup updates 118, which contain log records 122 of changes to the database since the last image copy 116 was made. The log records 122 each have associated with them an identifier 124 of an object 126 to which each applies, an identifier 128 of a data page 120 to which each applies, and a timestamp 130 for when that log record 122 was made.

In general, the referenced components of the database system 112, i.e., the database 114, image copies 116, and post-backup updates (e.g., log records and their contents) are all common to current database systems (although they may be known by different names or be arranged slightly differently) and, thus are conventional so that further details of their makeup need not be described since our relational database-related invention does not hinge upon the makeup of those components, but rather how they are used. Thus, persons of ordinary skill in the art will be able to readily apply the teachings of the instant disclosure even is there is some variation for particular relational database systems.

Before describing our process, for contrast, the current database recovery process for DB2 will briefly be described.

The current DB2 database recovery process starts by restoring the database data pages. The data pages from the image copies are restored via a buffer pool. Note here that the data pages in the buffer pool can be stolen before any of the log record application process begins. Next, the log datasets are read sequentially, in small portions, and only those small portions of the log records are sorted, by object, data page number, and timestamp. The updated data pages are then prefetched from the database into the buffer pool and the log records are applied in skip sequential order to the data pages in the buffer pool. Then, asynchronously, the DB2 buffer manager uses its ordinary deferred write processing to asynchronously write the pages to disk. Notably, these asynchronous write I/Os are random, making them very slow. Consequently, the physical disks involved in the process become very busy, which can further slow down the random read I/O and also fill the buffer pool with changed pages. If no buffers are available to read a page into, the read becomes gated behind the write I/O. After applying all of the updates for this small portion of log records, the process repeats for the next portion of log records. Thus, there are excessive read I/Os during the log record application because only small portions of the log records are sorted and applied iteratively. Moreover, for each iteration, the same pages may need to be repeatedly processed, which requires re-reading those pages back into the buffer pool over and over for log record application. There are also excessive I/Os during the rebuild of the database indexes because all of the data pages must be sequentially brought into the buffer pool so that the keys can be extracted.

Figure 2:
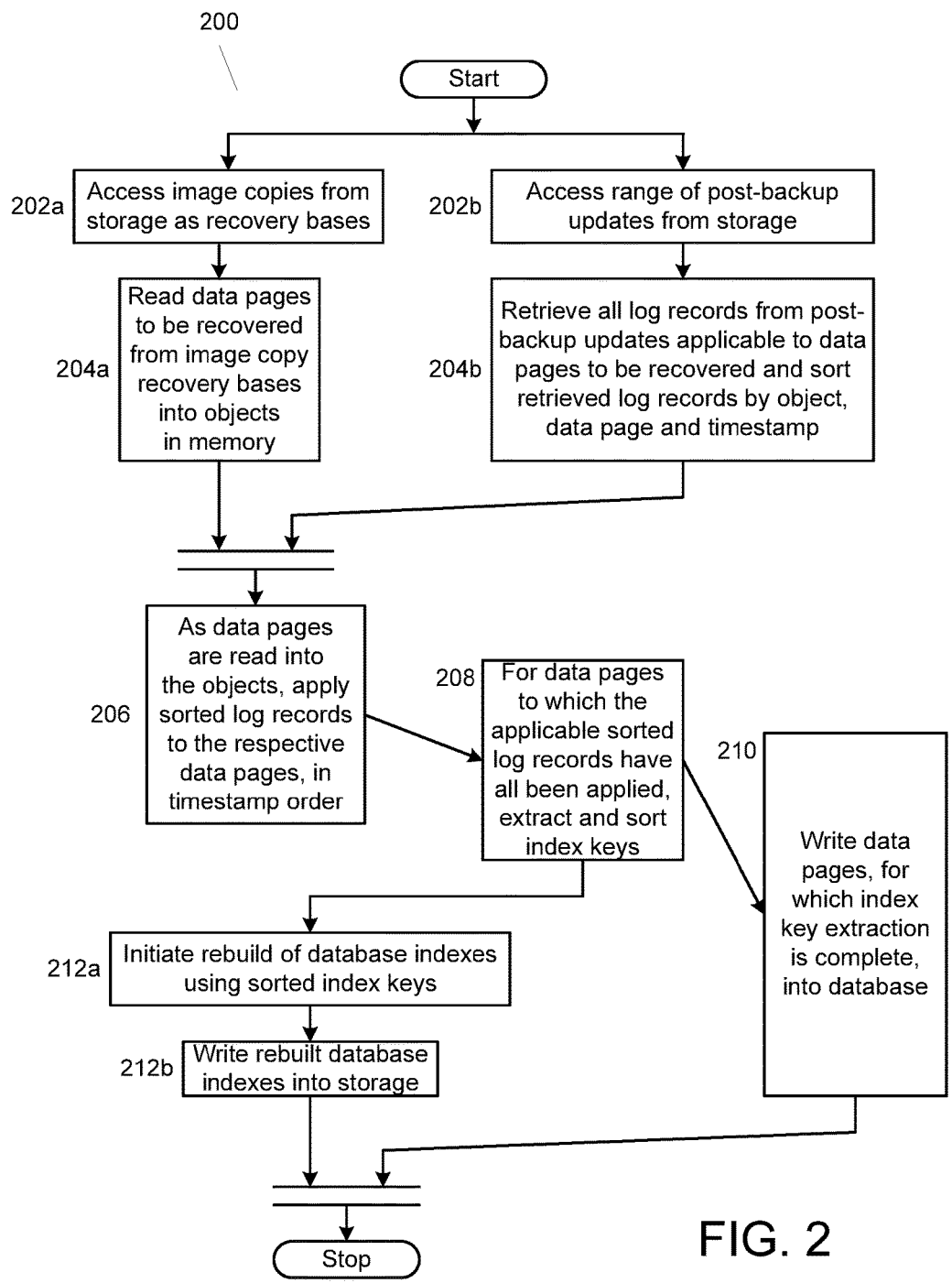
FIG. 2 which is a simplified flowchart of the functional steps that result from the processor(s) executing the program instructions relating to database recovery as described herein.

Having described the physical makeup of a computer system 100 as it would implement the teachings herein and provided an example of how current database recovery occurs in DB2, the inventive relational database recovery process will now be described with continuing reference to FIG. 1, and with reference to FIG. 2 which is a simplified flowchart 200 for the functional steps that would result from the processor(s) 106 executing the program instructions 110 relating to database recovery as described herein. Note here that, in FIG. 2, steps that are shown alongside each other can occur, in whole or part, concurrently in parallel.

The process begins at the point where it is determined that a database 114 needs to be rebuilt. When that happens, a command or set of instructions are sent to the computer system 100 to trigger the database rebuild function. As a result, the appropriate program instructions 110 are retrieved from the storage 104 and executed by the processor(s) 106 to cause the following steps to occur.

The processor(s) 106 will access the image copies 116 from the storage 104 for use as recovery bases (Step 202*a*) (referred to herein as "image copy recovery bases"). The processor(s) 106 will also access a range of the post-backup updates 118 stored in the storage 104 needed to be re-applied to the image copy recovery bases 116 in order to reconstruct the database 114 (Step 202*b*). Note that these steps will generally be performed in parallel, although either could start or complete before the other such that they only partially overlap in time.

Next, without regard to how far along Step 202*b* is, the processor(s) 106 will read the data pages 120 to be recovered from the image copies 116 into objects 126 in memory 108 (Step 204*a*). Concurrently with this step, the processor(s) 106 will retrieve into memory 108 all the log records 122 from the post-backup updates 118 that are applicable to the data pages 120 to be recovered and sort the retrieved log records 122 by object 126 identified by the indicator 124, data page number 128 and timestamp 130 (Step 204*b*).

Now, as the data pages 120 to be recovered are read into the objects 126, the sorted log records 122 for those data pages 120 are applied to the respective data pages 120 in timestamp order, from oldest to newest. This occurs until all of the data pages 120 have been read in and all the applicable sorted log records 122 have been applied (Step 206).

Now, on an individual data page 120 basis and concurrently with Step 206 proceeding, once an individual data page 120 has had all of its applicable log records 122 applied, the processor(s) 106 will begin extracting and sorting index keys 132 from the individual data pages 120 (Step 208), with Step 208 continuing until all of the data pages 120 have had their log records 122 applied and all of the index keys 132 have been extracted 134 from each data page 120 and sorted 136.

As Step 208 is proceeding with respect to the individual data pages 120, once all the index keys 132 have been extracted from any given data page 120, that data page 120 is written into the database 114 in storage 104 (Step 210) without regard to what other prior steps are in process or remain to be completed.

When all of the index keys 132 have been extracted 134 and sorted 136 for all of the recovered data pages 120, a rebuild of the database indexes, using the sorted index keys 136, is initiated (Step 212*a*).

Finally, once the database indexes have been rebuilt, using the sorted index keys 136, the rebuilt indexes 138 are written into the storage 104 without regard to whether or not the writing of all the recovered data pages 120 into the database 114 has completed.

As should now be appreciated, the specific ordering and steps involved in our approach involves a high degree of parallelism and concurrency as compared with conventional approaches that predominantly requires sequential steps where most, if not all, individual steps must be complete before the next step in the process can proceed. As a result, the time for recovery of a large database can be significantly reduced. Moreover, our approach dramatically reduces the number of asynchronous read I/Os and write I/Os relative to, for example, the current database recovery process used in DB2.

In addition, it should further be appreciated that, with our inventive approach, only the relevant log records 122 are read and sorted. Advantageously, by doing so at recovery time, it is already known exactly which objects need to be recovered. Still further, by applying all of the log records applicable to a data page at one time eliminates the need for re-reading the same data pages over and over. Likewise, the extraction of the index keys 132 from each individual data page 120 right after application of all the log records 122 for it has completed allows the rebuilding of the indexes to occur in parallel with the data recovery. This approach is a marked improvement over current approaches that either create partially sorted log files in real time that must be collected and merged into a single stream during recovery using all of the log files, even if not all of the objects need to be recovered, or buffer some of the needed log records in groups and sort those groups.

Thus, as should now be appreciated, our inventive and highly unconventional approach represents a significant improvement to computers tasked with recovering relational databases and to the relational database recovery process itself.

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A database recovery and index rebuilding system comprising:
   A) at least one processor coupled to memory so that that the processor can read from and write to the memory; and
   B) non-transitory storage, having stored therewithin
      i) program instructions that can be accessed and executed by the processor to effect database recovery and index rebuilding, and
      ii) a relational database system, wherein the relational database system includes
         a) a database,
         b) a set of image copies, and
         c) a set of post-backup updates, wherein the post-backup updates comprise log records each having an associated an identifier of an object to which each log record applies, an identifier of a data page to which each log record applies, and a timestamp indicating when each log record was made;
   C) wherein, when reconstruction of the database is required, the program instructions will be executed by the processor and will cause the processor to
      i) access the image copies as recovery bases;
      ii) access a range of post-backup updates, within the set of post-backup updates, that must be re-applied to data from the image copy recovery bases in order to reconstruct the database;
      iii) without regard to step "ii)", read data pages to be recovered from the image copy recovery bases into objects in the memory;
      iv) concurrently with step "iii)", retrieve, into the memory, all log records from the post-backup updates applicable to the data pages to be recovered and sort the retrieved log records by object, data page number and timestamp;
      v) as the data pages to be recovered are read into the objects in step "iii)", apply the sorted log records to their respective data pages, in timestamp order, until all of the sorted log records have been applied to all of their respective data pages;
      vi) as the applying of the respective sorted log records to the data pages in step "e)" completes for individual data pages and concurrently with the performing of step "v)" with respect to specific data pages for which the applying is not yet complete, extract and sort index keys, from the individual data pages for which the applying is complete, until all the index keys have been extracted from all the individual data pages and sorted;
      vii) concurrently with step "vi)" and on an individual recovered page basis, write the recovered individual data pages, for which the extraction of the index keys is complete, into the database in the non-transitory storage;
      viii) when all index keys have been extracted and sorted from all of the recovered individual data pages, initiate a rebuild of database indexes using the sorted index keys; and
      ix) when the database indexes have been rebuilt using the sorted index keys, write the rebuilt indexes to the storage without regard to whether step "vii)" has completed.

* * * * *